Jan. 5, 1960

M. V. KALFAIAN 2,920,311

INFORMATION STORAGE SYSTEM

Filed Nov. 10, 1958

INVENTOR.

Mogan V. Kalfaian

United States Patent Office 2,920,311

Patented Jan. 5, 1960

2,920,311

INFORMATION STORAGE SYSTEM

Meguer V. Kalfaian, Los Angeles, Calif.

Application November 10, 1958, Serial No. 773,062

3 Claims. (Cl. 340—173)

This invention relates to information storage systems, and particularly to a system for storing modulated electrical information in successive samples during a writing time-base period, and reproducing said stored samples in successive steps during a reading time-base period. Its main object is to provide a system of storing a plurality of electrical informations faithfully in successive steps, and reproducing said samples a number of times without effecting deterioration to the originally stored samples. Another object of the present invention is to provide a storage system without the use of cathode ray storage devices.

There have been made various types of storage devices, known as memory tubes of the cathode ray type. These tubes are advantageous in providing a large number of storage elements within a small surface area, and fast sampled quantities may be stored by the inertialess scanning beam. The gradations of these stored quantities, however, are poorly defined; and where faithful recording and reproduction of complex waveform is desired, the sampled quantities will fail to be in accord with exacting requirements. Accordingly, the principal object of the present invention is to circumvent the use of storage cathode ray tubes, by using a large number of storage capacitors in a unique electronic arrangement, for charging said capacitors in successive steps during a recording time-base period, in sampled quantities proportional to the varying amplitudes of a complex wave pattern to be recorded. These stored quantities are then resampled faithfully in successive steps during a reproduction time-base period, so as to reconstruct the original wave pattern. In a further object of the present invention, there is provided an electronic arrangement for distributing said samples among said capacitors for storage, and also for resampling said storage in the same distribution sequence. Due to the large values that may be chosen for said capacitors, resampling of the stored quantities may be made a large number of times without affecting their original storage. A circuit arrangement is also provided, however, for fast discharge of these storage capacitors, so that repeated recordings may be made without appreciable loss of time. The arrangement will be more fully described in the following specification by way of the accompanying schematic arrangement given in Fig. 1, and by further modifications given in Figs. 2 and 3.

Figure 1:
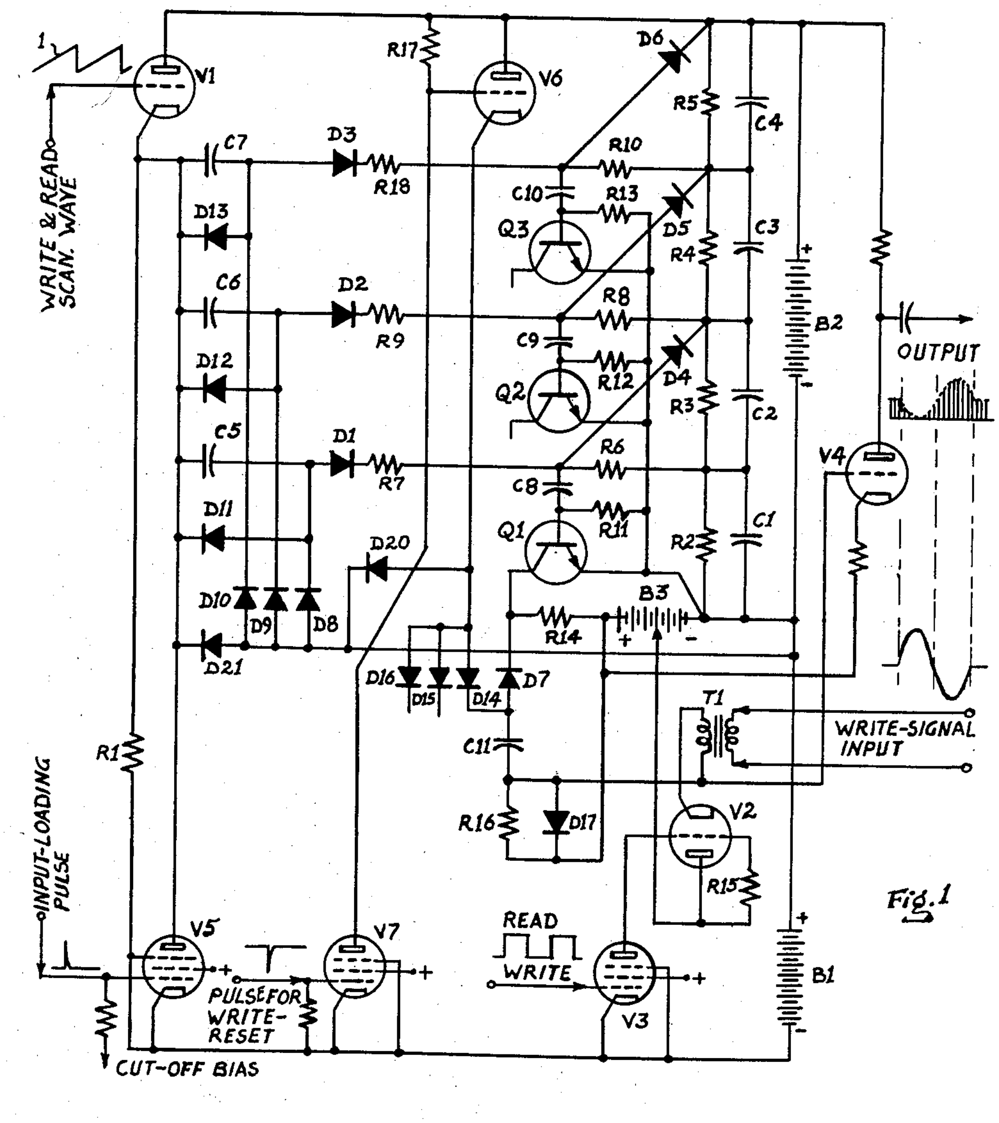

Referring now to the schematic arrangement of Fig. 1, both the writing and reading scanning time base waves 1 are applied upon the control grid of a cathode follower tube V1; a replica time base voltage being produced across the cathode circuit resistor R1. The current of cathode follower tube V1 flows through the series connected batteries B1 and B2. The potential of battery B1 is adjusted approximately equal to the normal voltage that is developed across resistor R1 when the input time base wave at control grid of the cathode follower tube V1 is minimum. Thus during quiescent period, the cathode potential of V1 is equal to the junction terminal between batteries B1 and B2. There are provided a plurality of voltage dividing taps in incremental steps across battery B2, by resistors R2 to R5, and bypass capacitors C1 to C4. The number of these voltage dividing taps depends upon the number of writing and reading samples that are desired to be made during the maximum scanning time base wave, for example, hundred or more per scan wave; only three sections being shown in the drawing for simplicity. Each of these voltage dividing taps is coupled to the cathode terminal of cathode follower tube V1, by way of a series connected network comprising, for example, resistors R6, R7; diode D1; and capacitor C5. Thus when the voltage across cathode circuit resistor R1 of cathode follower tube V1 is at minimum (equal to potential of B1), the voltage tap between resistors R2 and R3 is higher than at the cathode terminal of V1, and accordingly, current does not pass through diode D1 to charge capacitor C5; this condition also relating to diodes D2 and D3 through associated capacitors C6 and C7, and also resistors R8, R9 and R18, R10, at higher voltage dividing taps, respectively. When an input time base wave 1 is applied upon the control grid of cathode follower tube V1, and the voltage across cathode circuit resistor of V1 starts rising linearly, the capacitors C5 to C7 start charging in successive steps in series with diodes D1 to D3, respectively, at each coincidence of cathode potential of V1 with that of said voltage divisions across B2.

Referring to the first voltage division step across R2, as a typical example, the capacitor C5 starts charging and draws current through R6. The positive voltage developed across R6 is coupled to the base element of an NPN transistor Q1 through coupling capacitor C8, and load resistor R11. As the voltage across R6 keeps rising to the potential at junction terminal between resistors R3 and R4, current starts flowing through diode D4; and due to the low impedance of diode D4, it keeps the voltage across R6 substantially constant from there on. At this point, the positive voltage developed across coupling capacitor C8 discharges through load resistor R11, and the applied positive potential upon the base element of transistor Q1 drops to zero. This performance continues in successive steps with the rising potential at cathode terminal of cathode follower tube V1. For example, in the following step, a positive potential is developed across resistor R8 which is coupled to the base of NPN transistor Q2, through coupling capacitor C9 and load resistor R12. Clamping action of the rising voltage across resistor R8 is accomplished by diode D5, as described by way of the preceding step. Similarly, in the succeeding step, a positive voltage is developed across R10, and applied upon the base element of NPN transistor Q3, through coupling capacitor C10 and load resistor R13. As in the preceding steps, the rising voltage across resistor R10 is clamped by diode D6 (which may be eliminated by reason of being in the last stepped stage), and the voltage across load resistor R13 drops to zero by the discharge of coupling capacitor C10.

Referring again to the first stage, when positive voltage develops across resistor R6, a forward current passes through load resistor R11 by the discharge of coupling capacitor C8. Due to the clamping action of diode D4, the forward current across load resistor R11 becomes of short pulse duration. Thus, the transistor Q1 becomes conductive from its normal idle state, and passes current through output resistor R14; also being in pulse form. The pulse negative voltage developed across output resistor R14 is now stored across storage capacitor C11 through polarized diode D7, in series with polarized vacuum tube V2 and transformer T1; which completes the loop of a closed circuit across output resistor R14. The positive potential for transistors Q1 to Q3 (only Q1 being shown with complete electrical connections, for simplicity of drawing) are obtained from the battery B3. The anode element of vacuum tube V2, however, is biased at a negative tap on this voltage supply battery B3, so that the capacitor C11 is charged to an amplitude equal to the pulsed potential developed across output resistor R14, minus the amplitude of said bias. When a signal potential is to be recorded during operation of the transistor Q1, this signal potential is developed in the transformer T1, so that the amplitude of charge to be stored across capacitor C11 now equals the amplitude of pulsed voltage developed across output resistor R14 minus the total of voltages of said bias and the instantaneous voltage in transformer T1. Thus, the amplitude of voltage to be stored in capacitor C11 is determined by the instantaneous voltage in transformer T1; the latter voltage of which represents the signal information to be written. For maximum operating conditions, the bias tap from across battery B3 may be adjusted equal to half the maximum pulse voltage developed across the output resistor R14, and the peak signal voltage in transformer T1 adjusted not to exceed the bias potential. Thus maximum modulation of the charge in capacitor C11 may be obtained, without causing recharge of capacitor C11 by a high peaked signal voltage in transformer T1 after the pulsed voltage across output resistor R14 has dropped to zero. This charging action in said capacitors, in signal-modulated magnitudes, continues in successive steps as each transistor becomes operative from its normally idle state, in a successive step. Only one capacitor C11 is shown in the drawing, to avoid any crowding of component parts.

The triode vacuum tube V2, which acts as a series conductor of the modulating voltage in transformer T1, also acts as a diode during conduction by connection of the control grid to the anode element through resistor R15; assuming that the resistor R15 is of small value.

When all the storage capacitors, for example, C11, are charged under signal-controlled modulations, at the end of writing time base wave 1, the voltage across cathode circuit resistor R1 of cathode follower tube V1 drops to normal minimum, and another time base wave may be applied immediately upon the control grid of V1 to effect reading of the said recorded signal-voltages across capacitors, for example, C11, in the previous successive steps; although the reading time base period may differ from the writing time base period, if so desired. During reading time, the vacuum tube V2 is rendered inoperative by a high negative voltage applied upon its control grid, which is effected by the anode conductance of tube V3. As indicated by the square wave applied upon the control grid of tube V3, it is rendered nonconductive during write period, and conductive during read period. Thus during write period the high negative potential upon control grid of tube V3 removes the current from across resistor R15 (grid to anode of V2), rendering V2 conductive, and during read period the zero bias upon the control grid of tube V3 renders it conductive and draws current through resistor R15; building up cut-off negative bias upon the control grid of tube V2. When the reading time base wave starts rising, the transistors Q1 to Q3 become conductive successively in short pulsed periods, in the same manner as described previously; during write period. Since the vacuum tube V2 is not conducting at this time, however, the signal voltages in transformer T1, if any, do not impose new charge upon storage capacitors, for example, capacitor C11. Instead, the capacitors, for example, C11, are now charged in series with common load resistor R16; but this resistor being chosen of very high value, the original voltages across these capacitors remain undisturbed, and accordingly, these modulated voltages are transmitted in successive pulse steps to the control grid of amplifier tube V4. By choosing high values for these capacitors and the common load resistor R16, the modulated storage levels can be kept practically undisturbed during many readings of the stored information. The graphical illustration at the output of V4 shows how the signal wave is formed by pulses, in comparison with the original signal wave, as shown below said pulsed wave. The pulsed wave, as shown at the output, may be smoothed out in later stages by any known circuit arrangements that may be suitable.

In reference to the writing time base period, it was stated that the capacitors C5 to C7 are charged successively through diodes D1 to D3, respectively. During flyback period of either writing or reading time bases, these capacitors must be discharged, so that they can be recharged in successive steps again during another time base scanning period. This discharge is effected by the diodes D8 to D10, which are so polarized that they are inoperative while the voltage across cathode circuit resistor of cathode follower tube V1 is rising in the positive direction. When this rising voltage drops to minimum during flyback period, however, current passes through these individual diodes, and discharge their associate capacitors for a new start. The discharge of these capacitors is made in series with resistor R1, and in order to effect fast discharge, this resistor must be of very small value. If this latter is not practicable, however, a low impedance path can be secured by the conductance of tube V5. The control grid of V5 is normally biased highly negative, so as to render it anode current cut-off. During the flyback period, however, the control grid of tube V5 receives a positive pulse, as illustrated in the drawing, which renders V5 conductive with high current path in series with capacitors C5 to C7, and diodes D1 to D2; effecting fast discharge of said capacitors. Because of the high current passing through V5, the C5 to C7 discharge much faster than the entire duration of the positive pulse that may be applied upon the control grid of tube V5, and accordingly, keep on charging in the reverse polarity. To avoid charging of these capacitors in the reverse polarity, the diodes D11 to D13 are connected in parallel with capacitors C5 to C7, respectively, which are polarized to assume all of the series flowing current during reverse charging of these capacitors, and accordingly, effect fast discharge of capacitors C5 to C7 without effecting reverse charge in them. Due to the large number of diodes (D11 to D13) necessary to discharge capacitors C5 to C7, these capacitors may be completely eliminated, for economy purposes, and a single diode D21 may be used, as connected in Fig. 1. The current passing capabilities of diode D21 should be high enough to effect fast discharge of capacitors C5 to C7. Of course, the function of cathode follower V1 is one exemplary mode, and the time base waves may be arriving from a low impedance source; although R1 may also be chosen of low resistance value, by proper choice of associated component parts. In such case, the diodes D11 to D13, or D21, and also V5, may be eliminated, if so desired.

The information bearing capacitors, for example, C11, are charged unidirectionally, for example, in series with diode D7. When new information is desired to be recorded in these storage capacitors, the previously stored charges must be first erased. This erasing (discharge) is effected by conductance of the vacuum tube V6, in series with respective diodes D14 to D16, and a common load diode D17. The vacuum tube V6 is normally rendered non-conductive by a high negative bias applied upon its control grid from across resistor R17, by the normal conductance of tube V7. When during erase pulse period a negative pulse is applied upon the control grid of tube V7, such as illustrated in the drawing adjacent said grid, V7 becomes non-conductive and removes the negative-voltage-producing current from across resistor R17; causing V6 to conduct. The conduction of tube V6 forms a closed circuit loop in series with the plurality of diodes D14 to D16, in this case, for example, diode D14; storage capacitor C11; and the common load diode D17. Thus, any voltage that is stored in storage capacitor C11 (and the others which are not shown in the drawing) is discharged in series with tube V6, diode D14, and diode D17, for a new start. In order to prevent reverse charge of the storage capacitors, for example, capacitor C11, during conduction of tube V6, a large current carrying diode D20 is included, so as to assume all the series flowing current immediately after said capacitors are completely discharged from their previous storage. As shown in Fig. 1, the base elements of transistors Q1 to Q3 are connected to their emitter elements, without normal bias applied thereto. When these transistors are desired to be completely current cut-off in normal states, then a cut-off bias may be applied to said base elements. Also, further stages of amplifier transistors may be used with the transistors Q1 to Q3, if large pulse voltages are desired to be stored in capacitors, for example, capacitor C11. Further, the voltage clamping diodes D4 to D6 do not have to be connected as shown in the drawing, for example, the cathode element of diode D4 may be connected across a tap of the voltage dividing resistor R3; instead as shown.

Figure 2:
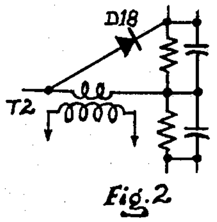
Figure 3:
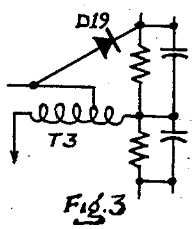

The circuit arrangement in Fig. 1 may be modified in different ways, for example, as shown in Figs. 2 and 3. In Fig. 1, the resistor R6, the coupling capacitor C8, and load resistor R11 may be replaced by the transformer T2, as shown in Fig. 2. Since a pulse output may be obtained from the secondary of transformer T2 without the use of diode D18, the latter may be eliminated, if so desired. Instead of using a transformer, as in Fig. 2, an autotransformer T3 may also be used, as shown in Fig. 3; the diode in this case being necessary, similar to the use in Fig. 1. Also, the transistors Q1 to Q3 may be eliminated, if so desired, as these are used only to amplify the signal pulse, for storage in the capacitors, for example, in capacitor C11. In this case, the separate load resistors R11 to R13 will be eliminated, and the pulse signals received from the coupling capacitors C8 to C10 will be applied upon a common load resistor in series with individual diodes; transistors Q1, Q3, diodes D14 to D16, diodes D7, D17, D20, capacitor C11, resistors R14, R16, and tubes V7, V6 also being eliminated. When the voltage-dividing resistors R2 to R5 are used having very small resistive values, the bypass capacitors C1 to C4 may be eliminated.

Having described the nature of the invention, and in reference to the exemplary embodiments hereinabove set forth, it had been shown that various modifications, adaptations, and substitutions of parts may be made without departing from the spirit and scope of the invention, for example, the circuit arrangement of Fig. 1 may be utilized to produce evenly distributed output pulses during a time base wave, instead of said information storage, and operate successively a large number of flip-flop trigger circuits by said output pulses; said trigger circuits effecting the storage of information.

What I claim is:

1. A system of recording signal components in successive steps and reproducing same in successive steps during recording and reproducing time bases, respectively, the system comprising a first impedance means; means for producing a recording time base rising voltage in said first impedance means; a voltage source; a plurality of taps in incremental steps across said voltage source; a plurality of first coupling means distributed from a common terminal point of said first impedance means to said taps, respectively, each coupling means comprising a first capacitor, a first diode and a second impedance means connected in series circuit, and said diode so polarized as to admit current flow only when said rising voltage is higher in amplitude than the voltage at the respective tap, thereby producing successive steps of current flow through said plurality of impedance means during the rising voltage in said first impedance means; means for deriving a voltage pulse from each of said plurality of impedances at the time of each of said admitted current, so as to produce successive steps of voltage pulses; a plurality of second coupling means, each comprising a second diode and a second capacitor; means for storing said plurality of derived voltage-pulses in said second capacitors in series with said second diodes, respectively, the one end terminals of last said capacitors being connected in parallel, remote from the second diodes; a third impedance means connected common to the parallel terminals of said second capacitors, for transmitting said successive steps of voltage-pulses to the third impedance means; a source of modulating voltage; on-and-off switching means for switching last said source to on-position during said recording time base period, for modulating the storage quantity of said pulse voltages in said second capacitors; means for producing a reproducing time base rising voltage in said first impedance means for producing similar pulses in the first coupling means; and means for switching last said source to off-position by said switching means during said reproduction period, whereby transmitting said successive steps of voltage-pulses, during said reproduction period, to said third impedance means proportional to said modulated storage quantities in said second capacitors.

2. The system as set forth in claim 1, wherein is included a plurality of normally idle discharging means coupled to said second capacitors, respectively; means for producing a pulse signal at the start of said recording time base rising voltage; and means for applying last said pulse to said plurality of discharger means for discharging pre-recorded charges in said second capacitors.

3. The system as set forth in claim 1, wherein is included a plurality of polarized discharger means coupled to said first capacitors, respectively, for discharging the charge stored in each of the said first capacitors during flyback period of said recording time base rising voltage.

No references cited.